United States Patent
Pradeep et al.

(10) Patent No.: US 11,471,854 B2
(45) Date of Patent: Oct. 18, 2022

(54) REMOVAL OF LEAD FROM WASTE WATER USING NANOSCALE MOS₂

(71) Applicant: Indian Institute of Technology Madras (IIT Madras), Chennai (IN)

(72) Inventors: Thalappil Pradeep, Chennai (IN); Biswajit Mondal, Chennai (IN); Ananthu Mahendranath, Chennai (IN); Anirban Som, Chennai (IN); Sandeep Bose, Chennai (IN); Tripti Ahuja, Chennai (IN); Avula Anil Kumar, Chennai (IN); Jyotirmoy Ghosh, Chennai (IN)

(73) Assignee: Indian Institute of Technology Madras (IIT Madras), Chennai (IN)

( * ) Notice: Subject to any disclaimer, the term of this patent is extended or adjusted under 35 U.S.C. 154(b) by 53 days.

(21) Appl. No.: 16/771,635

(22) PCT Filed: Dec. 5, 2018

(86) PCT No.: PCT/IN2018/050814
§ 371 (c)(1),
(2) Date: Jun. 10, 2020

(87) PCT Pub. No.: WO2019/116383
PCT Pub. Date: Jun. 20, 2019

(65) Prior Publication Data
US 2021/0178356 A1   Jun. 17, 2021

(30) Foreign Application Priority Data
Dec. 11, 2017   (IN) ............................. 201741044447

(51) Int. Cl.
| | | |
|---|---|---|
| B01D 53/64 | (2006.01) | |
| B01D 53/81 | (2006.01) | |
| B01J 20/02 | (2006.01) | |
| B01J 20/28 | (2006.01) | |
| C02F 1/28 | (2006.01) | |
| C01G 39/00 | (2006.01) | |
| C02F 1/62 | (2006.01) | |
| C02F 101/20 | (2006.01) | |

(52) U.S. Cl.
CPC .......... B01J 20/0218 (2013.01); B01D 53/64 (2013.01); B01D 53/81 (2013.01); B01J 20/0285 (2013.01); B01J 20/2805 (2013.01); B01J 20/28052 (2013.01); C01G 39/006 (2013.01); C02F 1/281 (2013.01); C02F 1/62 (2013.01); B01D 2253/1128 (2013.01); B01D 2257/60 (2013.01); C02F 2101/20 (2013.01); C02F 2305/08 (2013.01)

(58) Field of Classification Search
CPC ................ B01J 20/0218; B01J 20/0285; B01J 20/28052; B01J 20/2805; B01D 53/64; B01D 53/81; B01D 2257/60; B01D 2253/1128; C02F 2305/08; C02F 1/62; C02F 1/281; C02F 1/28; C02F 1/00; C02F 2101/20; C01G 39/006; C01G 39/06
See application file for complete search history.

(56) References Cited

U.S. PATENT DOCUMENTS

| | | | |
|---|---|---|---|
| 4,996,108 A | * | 2/1991 | Divigalpitiya ........ C01B 19/007 427/430.1 |
| 7,390,416 B1 | | 6/2008 | Ede et al. |
| 10,493,426 B2 | * | 12/2019 | Zhang .................... C01G 41/00 |

FOREIGN PATENT DOCUMENTS

| | | | | |
|---|---|---|---|---|
| CN | 106955678 A | | 7/2017 | |
| CN | 108 439 470 A | * | 8/2018 | .......... B01J 20/0218 |
| EP | 3 744 692 A1 | * | 12/2020 | ................ C02F 1/66 |
| RU | 182 087 U1 | * | 8/2018 | ............. B01D 24/28 |
| WO | 2016/187626 | | 11/2016 | |

OTHER PUBLICATIONS

Ai et al., "MoS₂ Nanosheets with Widened Interlayer Spacing for High-Efficiency Removal of Mercury in Aquatic Systems," *Adv. Fund. Mater.* 26:5542-5549, 2016.

Jia et al., "Two-Dimensional Molybdenum Disulfide as a Superb Adsorbent for Removing $Hg^{2+}$ from Water," *ACS Sustainable Chem. Eng.* 5:7410-7419, 2017.

Ma et al., "Highly Selective and Efficient Removal of Heavy Metals by Layered Double Hydroxide Intercalated with the MoS42-ion," *J. Am. Chem. Soc.*, 2016, DOI: 10.1021/jacs.6b00110, 35 pages.

Massey et al., "Hierarchical Microspheres of MoS2 Nanosheets: Efficient and Regenerative Adsorbent for Removal of Water-Soluble Dyes," *Ind. Eng. Chem. Res.*, 2016, DOI: 10.1021/acs.iecr.6b01115, 28 pages.

Wang et al., "One-pot synthesis of multifunctional magnetic ferrite-MoS₂-carbon dots nanohybrid adsorbent for efficient Pb(II) removal," *J. Mater. Chem. A*, 2016, DOI:10.1039/C6TA0269B, 9 pages.

Aghagoli et al., "Hybrid nanosheets composed of molybdenum disulfide and reduced graphene oxide for enhanced solid phase extraction of Pb(II) and Ni(II)," *Microchim Acta* 184:231-244, 2017.

(Continued)

*Primary Examiner* — Timothy C Vanoy

(74) *Attorney, Agent, or Firm* — Seed IP Law Group LLP

(57) ABSTRACT

The process of reacting nanoscale ce-MoS₂ nanosheets anchored on oxide support with lead in solution at room temperature whereby the reaction is rapid and spontaneous resulting in the formation of $PbMoO_{4-x}S_x$ in the process of scavenging $Pb^{2+}$ and $Pb^{4+}$ present in the solution.

10 Claims, 6 Drawing Sheets

(56) References Cited

OTHER PUBLICATIONS

Figure 1:
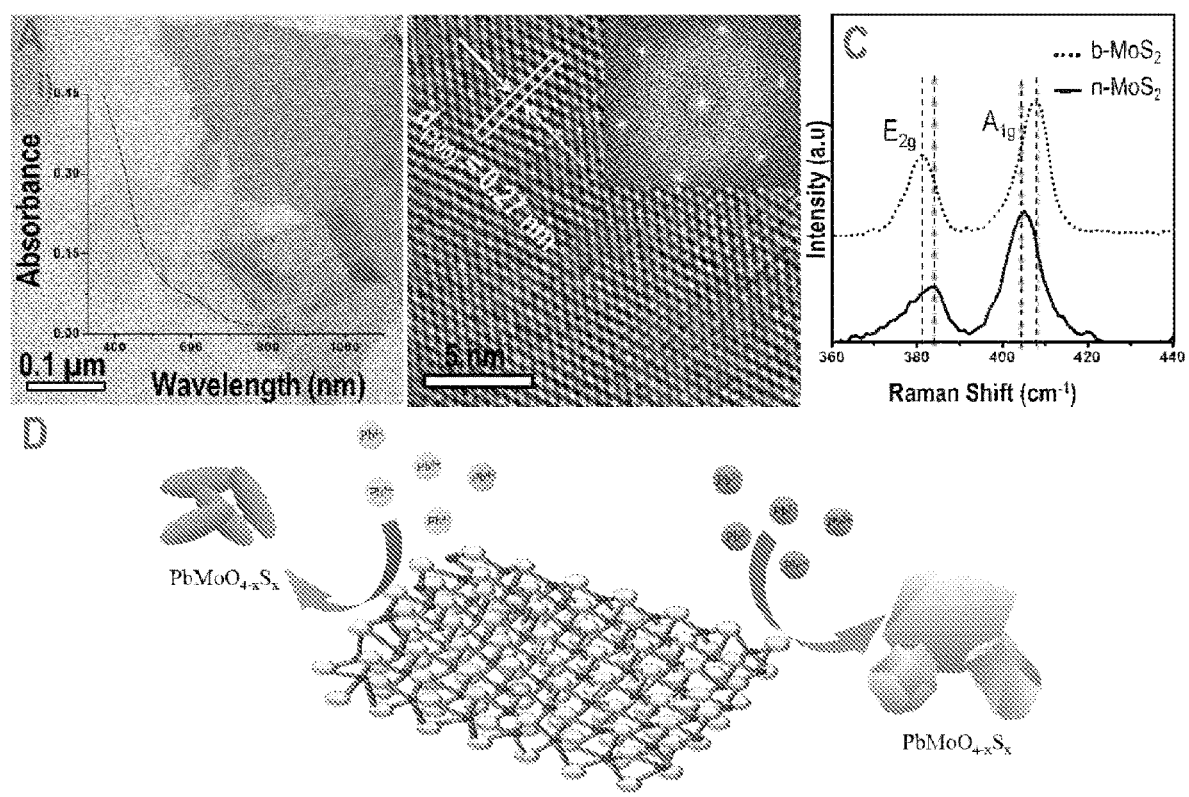

Liu et al., "Two-dimensional molybdenum disulfide as adsorbent for high-efficient Pb(II) removal from water," *Applied Materials Today* 9:220-228, Jul. 2017.

Wang et al., "Environmental Applications of 2D Molybdenum Disulfide ($MoS_2$) Nanosheets," *Environ. Sci. Technol.* 57:8229-8244, Jun. 2017.

\* cited by examiner

REMOVAL OF LEAD FROM WASTE WATER USING NANOSCALE MOS$_2$

FIELD OF THE INVENTION

The present invention relates to a chemical reactivity of MoS$_2$ nanosheets with Pb$^{2+}$ and Pb$^{4+}$ in solution forming PbMoO$_4$. This reactivity can be employed for removing toxic lead in solutions.

BACKGROUND OF THE INVENTION

Inorganic analogues of graphene, due to their unusual electrical [Ma X et al., Adv. Mater. Res. (Durnten-Zurich, Switz.) 2013, 651, 193-197, 6 pp; Kim, T. Y et al. ACS Nano 2016, 10, 2819-2826, Kim, J. S., et al., ACS Nano 2016, 10, 7500-7506], electronic [Radisavljevic B et al., Nat Nano 2011, 6, 147-150; Wei, X.-L et al., Journal of Materials Chemistry A 2014, 2, 2101-2109; Steinhoff A et al., Nano Letters 2014, 14, 3743-3748], magnetic[Gao N et al., J. Phys. Chem. C 2017, 121, 12261-12269; Tongay S et al., Appl. Phys. Lett. 2012, 101, 123105/1-123105/4; Saab M et al., The Journal of Physical Chemistry C 2016, 120, 10691-10697] and catalytic properties[Li Y et al., Journal of the American Chemical Society 2011, 133, 7296-7299; Lukowski M. A. et al., Journal of the American Chemical Society 2013, 135, 10274-10277; Voiry, D et al., Nano Letters 2013, 13, 6222-6227; Pi Y et al., ACS Sustainable Chem. Eng. 2017, 5, 5175-5182], are fascinating materials which have made great inroads into materials science of the recent past. While their novel physical properties have been fascinating, most such investigations have left the nanostructures undisturbed. As the physical properties have been inherent to the nanosystems, retention of the structure has been essential for the properties. Likely chemical changes on them during the processes have been of limited concern. MoS$_2$ has been a hydrodesulphurization catalyst [de Beer, V. H. J et al., Journal of Catalysis 1976, 42, 467-470; Paul, J.-F et al., J. Phys. Chem. B 2003, 107, 4057-4064; Tye, C. T et al., Topics in Catalysis 2006, 37, 129-135] which requires the edge sites to be catalytically active. The process by itself leaves the overall structure chemically unchanged although transient changes occur during the hydrodesulphurisation event. From various investigations, it is now clear that the chemical properties of nanoscale materials can be distinctly different from the bulk and such reactivity could make inorganic analogues of graphene to be new reagents [Chen, Z et al., The Journal of Physical Chemistry C 2013, 117, 9713-9722; Mondal, B et al., Nanoscale 2016, 8, 10282-10290].

Water is becoming increasingly contaminated by wide variety of pollutants mainly from agricultural and industrial sources. Among all these, heavy metal contamination in water is a worldwide concern, because of their immense toxicity. Thus, to access free water, removal of heavy metals from water becomes essential. Lead toxicity and its adverse health effects are well known. The lack of understanding the risks involved in the use of lead resulted in its widespread utilization, due to which plumbism came as an aftermath in many societies. There is even a hypothesis that suggest that lead poisoning might have shepherd the decline of Roman Empire, where lead pipe networks were used for water distribution [Nriagu, J. O, The New England Journal of Medicine 1983; 308:660-663]. Apart from being present as a contaminant in various water sources, lead is also a common pollutant in air along with other heavy metals like cadmium and mercury. Depending on the level of exposure, lead causes a variety of diseases mainly affecting the nervous system. So, its removal from the environment is as essential as other toxic heavy metals.

Many techniques have been employed such as ion exchange, electrochemical process, membrane separation, adsorption, chemical precipitation etc., for heavy metal remediation from water. Among all these techniques, adsorption is the most promising one because of its ease of operation, simplicity in design and low cost. In this context, the use of new materials is becoming very essential.

With this objective, the present invention explored the difference in chemical reactivity of bulk MoS$_2$ (b-MoS$_2$) versus its chemically exfoliated nanoscale analogue (ce-MoS$_2$), with Pb$^{2+}$ and Pb$^{4+}$ in solution. While b-MoS$_2$ turned out to be completely unreactive, ce-MoS$_2$ rapidly transformed to PbMoO$_{4-x}$S$_x$ in a reaction utilizing hydroxyl ions in solution. We show such reactions of ce-MoS$_2$ anchored on oxide supports can be effective means to scavenge Pb$^{2+}$ and Pb$^{4+}$ in solution, creating novel media for heavy metal remediation in waste water.

SUMMARY OF THE INVENTION

The present invention relates to a nanoscale forms of MoS$_2$ used for removal for toxic lead in solutions. More particularly, the present invention explored the difference in chemical reactivity of bulk MoS$_2$ (b-MoS$_2$) versus its chemically exfoliated nanoscale analogue (ce-MoS$_2$), with Pb$^{2+}$ and Pb$^{4+}$ in solution.

In one embodiment, the invention illustrates synthesis of chemically exfoliated MoS$_2$ nanosheets (ce-MoS$_2$NSs). The process of reacting nanoscale ce-MoS$_2$ nanosheets anchored on oxide support with Pb in solution at room temperature whereby the reaction is rapid and spontaneous resulting in the formation of PbMoO$_4$-xS$_x$. This novel reaction can be used for scavenging Pb$^{2+}$ and Pb$^{4+}$ in solution.

DETAILED DESCRIPTION OF DRAWINGS

FIG. 1 (A) Representative TEM image of ce-MoS$_2$ NSs. The optical absorption spectrum is shown in the inset. (B) HRTEM image of a NS. Corresponding FFT pattern is shown in the inset. Lattice plane is marked (C) Raman spectrum of bulk MoS$_2$ and NSs. (D) Schematic of the overall reaction between ce-MoS$_2$ and Pb ions.

Figure 2:
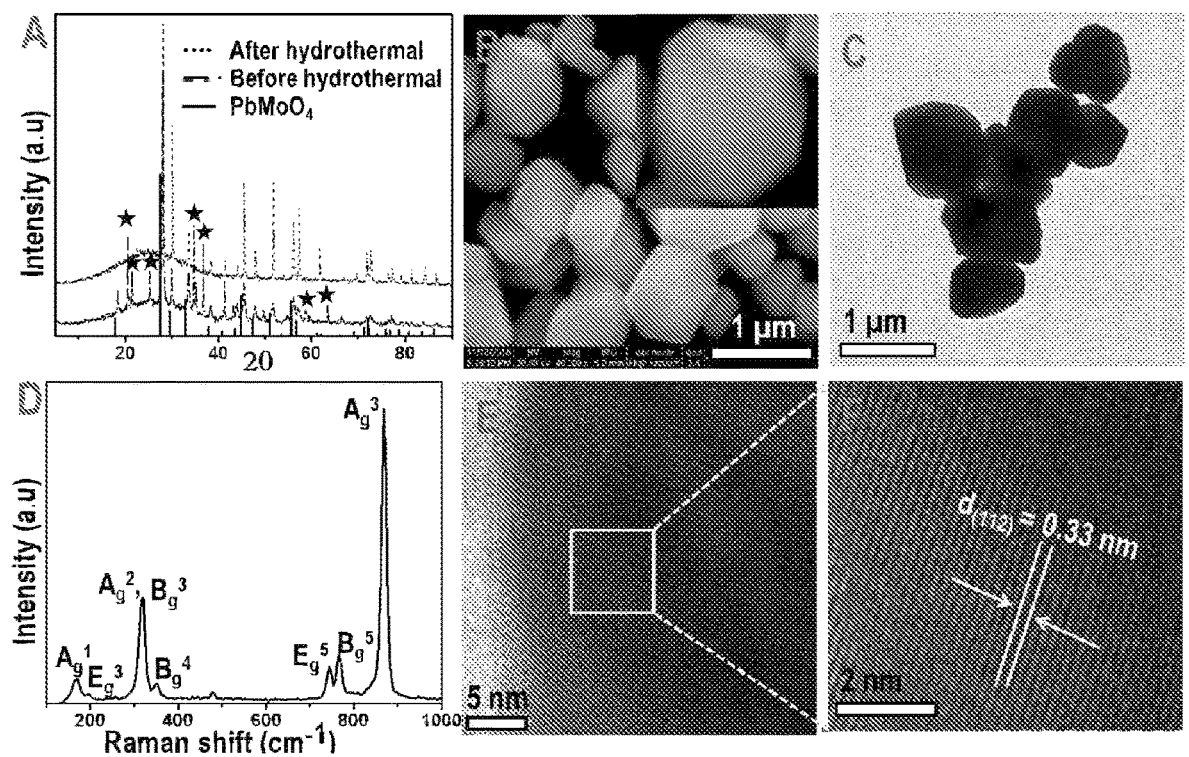

FIG. 2 Characterization of the reaction product of MoS$_2$ and Pb$^{2+}$ ions. (A) Standard peaks of PbMoO$_4$ are plotted along with the observed XRD pattern before and after the hydrothermal treatment of the reaction product. (B) SEM image showing polyhedron morphology of PbMoO$_4$-xSx. Inset shows SEM image of one of such polyhedron. (D) Raman spectrum; TEM and HRTEM image of the same is shown in (C) and (E), respectively. A particular area of image E is marked and magnified version of that area is shown in F.

Figure 3:
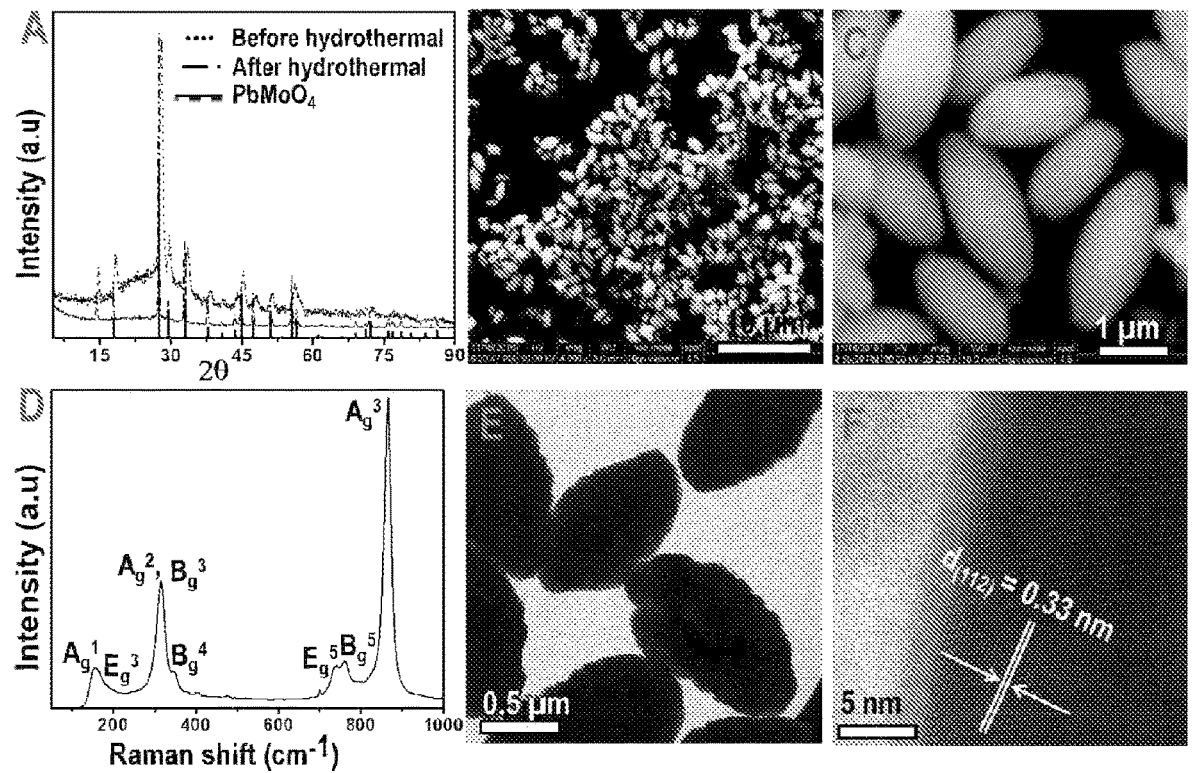

FIG. 3 Characterization of final reaction product (MoS$_2$+Pb$^{4+}$ ions). (A) PXRD pattern of the reaction product before and after the hydrothermal treatment. SEM image at different magnifications are shown in (B, C). (D) Raman spectrum of the final reaction product. (E, F) TEM and HRTEM image of the same, respectively.

Figure 4:
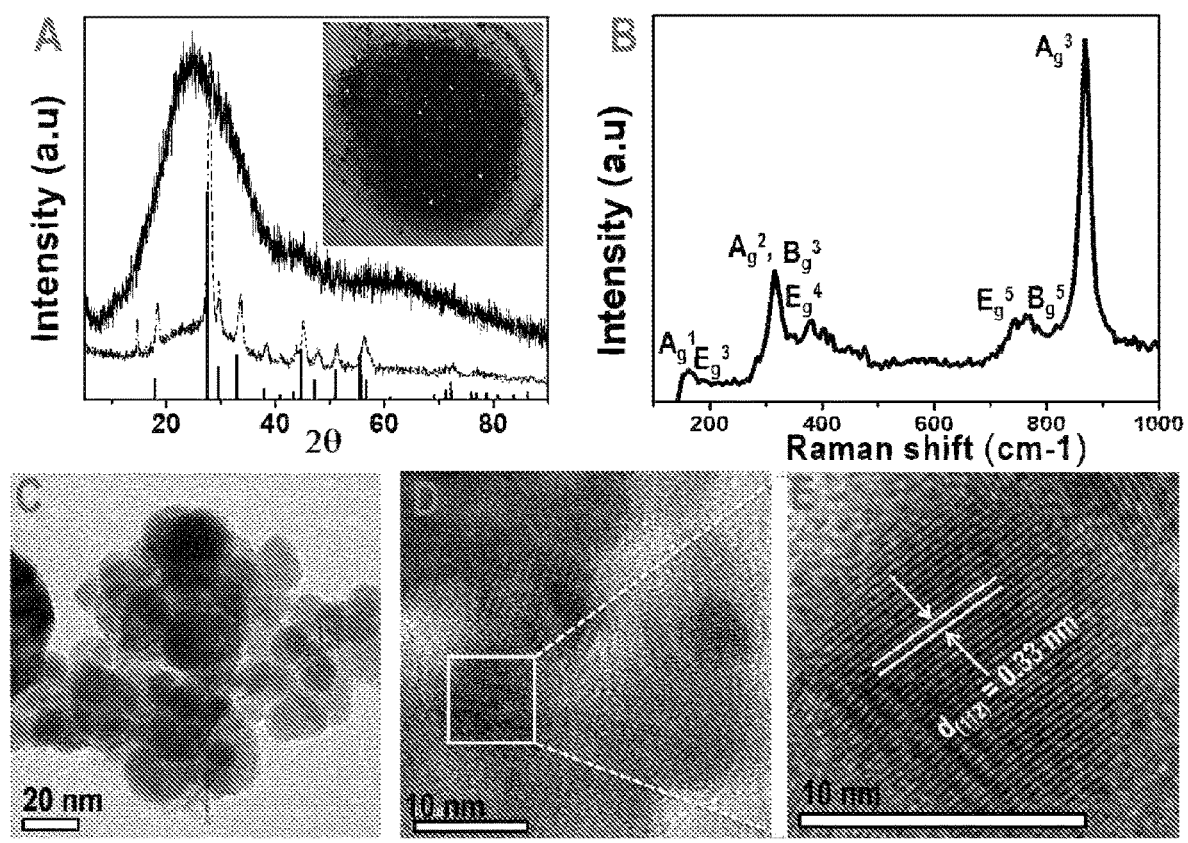

FIG. 4 Conversion of microparticles to nanoparticles by mechanical grinding of the final reaction product. Standard peaks of PbMoO$_4$ plotted with the XRD pattern of the reaction product before and after the mechanical grinding. Inset shows the photograph of the product after grinding. (B) Raman spectrum of the same showing all the characteristic vibrations. (C, D) TEM and HRTEM image of such particles, respectively. (E) Magnified HRTEM image of one of such particles; lattice distance is marked.

Figure 5:
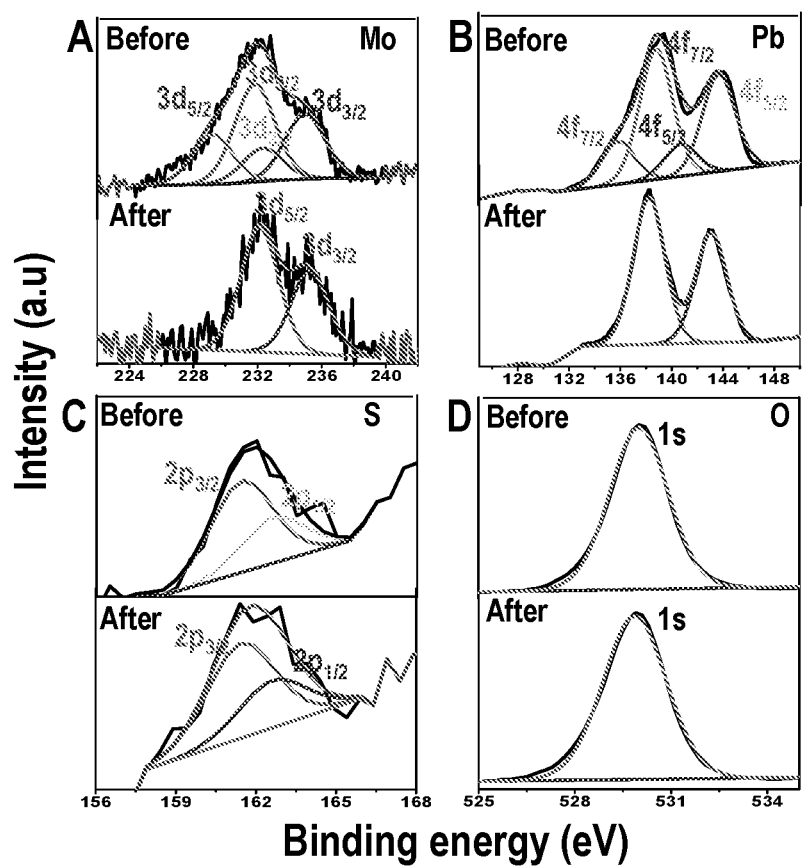

FIG. 5 XPS data to support the formation of $PbMoO_4$-$xS_x$. A (i-ii), B (i-ii), C (i-ii) and D (i-ii) correspond the XPS in the Mo 3d, Pb 4f, S 2p and O 1s regions, before and after the hydrothermal treatment, respectively.

Figure 6:
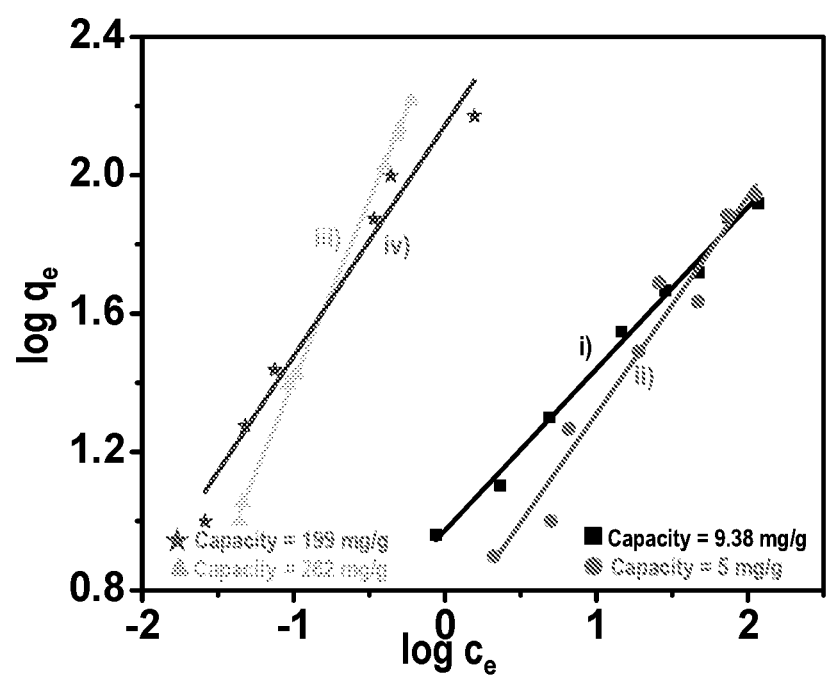

FIG. 6 Equilibrium $Pb^{2+}$ batch adsorption data, fitted using Freundlich isotherm (i, ii) Adsorption isotherm using only alumina and silica, respectively. $Pb^{2+}$ removable capacity of $Al_2O_3$@ce-$MoS_2$, $SiO_2$@$MoS_2$ are shown in (iii, iv), respectively.

Referring to the drawings, the embodiments of the present invention are further described. The figures are not necessarily drawn to scale, and in some instances the drawings have been exaggerated or simplified for illustrative purposes only. One of ordinary skill in the art may appreciate the many possible applications and variations of the present invention based on the following examples of possible embodiments of the present invention.

DETAILED DESCRIPTION OF THE INVENTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The present invention explored the difference in chemical reactivity of bulk $MoS_2$ (b-$MoS_2$) versus its chemically exfoliated nanoscale analogue (ce-$MoS_2$), with $Pb^{2+}$ and $Pb^{4+}$ in solution. While b-$MoS_2$ turned out to be completely unreactive, ce-$MoS_2$ rapidly transformed to $PbMoO_{4-x}S_x$ in a reaction utilizing hydroxyl ions in solution. We show such reactions of ce-$MoS_2$ anchored on oxide supports can be effective means to scavenge $Pb^{2+}$ and $Pb^{4+}$ in solution, creating novel media for heavy metal remediation in waste water.

The following sections provide the detailed description of a method of synthesizing $MoS_2$NSs, the proposed driving mechanism behind the interaction of lead ions and $MoS_2$ NSs, in an aqueous medium, and its application in heavy metal remediation in waste water. As the science will happen irrespective of the medium, the same will be the chemistry in a non-aqueous medium as well.

Synthesis of Chemically Exfoliated MoS2 Nanosheets:

The synthesis of chemically exfoliated $MoS_2$ nanosheets (ce-$MoS_2$NSs) was carried out using a conventional chemical exfoliation method [Coleman, J. N., et al. Science (Washington, D.C., U. S.) 2011, 331, 568-571]. In an inert atmosphere of argon, 3 mL of 1.6 M n-butyllithium in hexane was added to 300 mg of bulk $MoS_2$ (powder) taken in a round-bottom flask. The system was left with constant stirring for nearly 48 h, maintaining the inert atmosphere. After 48 h, the lithium intercalated product ($Li_xMoS_2$) was collected and washed repeatedly with hexane to remove the unreacted n-butyllithium. 100 mL of distilled water was then added to this intercalated material and the system was sonicated for 1 h using a bath sonicator. Finally, this aqueous dispersion of $MoS_2$ NSs was centrifuged at 18000 rpm for 15 minutes to remove the unexfoliated $MoS_2$ as a precipitate. The supernatant containing the ce-$MoS_2$ NS was used for reactivity studies.

Reaction of ce-$MoS_2$ NSs with $Pb^{2+}$:

4 ml of as prepared $MoS_2$ NSs dispersion in water (4.2 mM, in term of Mo concentration) was taken in a reaction bottle, to which 1 mL (23 mM) of lead acetate solution was added. A white precipitate was observed immediately, upon the addition of $Pb(OAC)_2$. The reaction was continued for 6 h under constant magnetic stirring and was monitored by UV/Vis spectroscopy. The reaction mixture was then centrifuged at 3000 rpm for 5 min. The precipitate was collected and washed repeatedly with $H_2O$ to remove the excess reactants. Concentration-dependent reactions were performed by keeping the ce-$MoS_2$ concentration same (4 mL, 4.2 mM) and varying Pb $(OAC)_2$ concentration (23 mM, 46 mM, 66 mM and 92 mM).

Reaction of ce-$MoS_2$ NSs with $Pb^{4+}$:

Reaction with $Pb^{4+}$ was done in a similar fashion as in the case of $Pb^{2+}$, except for the use of a mixed solvent ($H_2O$: acetic acid 1:1) as $Pb^{4+}$ Source used ($PbO_2$) is not soluble in $H_2O$.

The present invention shows that the chemical exfoliation of $MoS_2$ NSs involved two steps. The first step involved the intercalation and in the second step, the intercalated product was exfoliated in water. The quality of the NSs was examined using various spectroscopic and microscopic techniques. Typically, ce-$MoS_2$ NSs were of 200 to 1000 nm in length and had an average thickness of 2-3 layers (FIG. 1a). The UV-visible absorption spectra (inset of FIG. 1a) of the ce-$MoS_2$ NSs dispersion, shows the characteristic peaks at 435 cm, 611 cm, and 668 cm, [Wang, K., et al., ACS Nano 2013, 7, 9260-9267; Liu, H.-L Appl. Phys. Lett. 2014, 105, 201905/1-201905/4] of which the two features between 600-700 nm are known to arise from the direct transitions happening at the K point of the Brillion zone[Mac, K. F et al., Phys. Rev. Let. 2010, 105, 136805/1-136805/4]. The HRTEM image (FIG. 1b) of the ce-$MoS_2$ NSs showed well resolved hexagonal lattice structure and a lattice spacing of 0.27 nm correspond to the d(100) plane[Yuen, L et al., Chem. Common. (Cambridge, U. K.) 2016, 52, 529-532]. The Fast Fourier Transform (FFT) pattern of the HRTEM image (inset, FIG. 1b) showed the expected hexagonal pattern for graphenic equivalents.

The quality of the NSs was further probed using Raman spectroscopy. On comparing the Raman spectra (FIG. 1c) of bulk $MoS_2$ with ce-$MoS_2$, we find that the peak difference of $A_{1g}$ and $E_{2g}$ modes had decreased (~19 $cm^{-1}$) in the later. This difference corresponds to a thickness of approximately 2-3 layers in n-$MoS_2$. Also the FWHM for the $A_{1g}$ mode has increased in n-$MoS_2$ (FIG. 1C) suggesting a successful exfoliation of b-$MoS_2$[Wang, K., et al., ACS Nano 2013, 7, 9260-9267; Lee C. et al., ACS Nano 2010, 4, 2695-2700].

The reaction products between $Pb^{2+}$/$Pb^{4+}$ and $MoS_2$, in its bulk and 2D nanoscale forms, were investigated. Solutions of $Pb^{2+}$ and $Pb^{4+}$, added to the b-$MoS_2$ (powder) separately, remained unreactive for an extended period of time without any visible change in either the color of the dispersion or the morphology and chemical composition of the $MoS_2$ particles. The inactiveness of b-$MoS_2$ towards lead ions can be explained by thermochemical values. In stark contrast to this behaviour of b-$MoS_2$, ce-$MoS_2$ showed an immediate reaction with both the ions. Upon mixing lead ions (both $Pb^{2+}$ and $Pb^{4+}$, separately) with ce-$MoS_2$ dispersion, an immediate visual change was noticed. The light green color of the ce-$MoS_2$ dispersion turned milky white, followed by immediate precipitation of the reaction products. The white precipitate was collected and washed several times with water to remove any unreacted reactants. Both the ions ($Pb^{2+}$ and $Pb^{4+}$) gave the chemically identical reaction products, however, with different morphologies (FIG. 1D). The white precipitate obtained through the reaction of $Pb^{2+}$ with ce-$MoS_2$ NSs was subjected to powder X-ray diffraction (PXRD) analysis (blue trace, FIG. 2A). The PXRD pattern of the product was similar to the standard PXRD pattern of $PbMoO_4$, along with a set of other peaks. These extra peaks are marked with an asterisk (*). We presumed that these peaks originated from the presence of other phases, probably metastable ones, as these could not be matched with any known phases containing the elements.

Pb, Mo, O, and S, as confirmed from EDS spectroscopy. To test our hypothesis, the material was hydrothermally treated at various temperatures with the expectation that these metastable phases will transform into a single, thermodynamically stable phase. An exact match with $PbMoO_4$ in PXRD pattern was observed after 24 h of hydrothermal treatment of the product at 190° C. (black trace, FIG. 2A), proving our hypothesis to be correct. The morphological characterization of this hydrothermally treated product was carried out using an SEM, which confirmed that the size of the microcrystals is of the order of a few microns with polyhedron morphology (FIG. 2B). The product was further characterized using Raman spectroscopy in the range from 100 to 1000 $cm^{-1}$ (FIG. 2D) [Vilaplana, R et al., J. Appl. Phys. 2012, 112, 103510/1-103510/10]. The Raman spectrum of the product was dominated by one stretching mod-e$A_g^3$ at 868.8 $cm^{-1}$. The two peaks at 767.3 $cm^{-1}$ and 745.7 $cm^{-1}$ can be assigned to anti-symmetric stretching $B_g^5$ and $E_g^5$ vibrational modes, respectively. Raman peaks at 351.3 $cm^{-1}$ and 319.1 $cm^{-1}$ correspond to the weaker By mode and stronger $A_g^2/B_g^3$ modes, respectively. The peaks at 197.1 $cm^{-1}$ and 170.2 $cm^{-1}$ were assigned to $E_g^3$ and $A_g^1$ modes. TEM image of the product was taken at different magnifications, for further characterization (FIG. 2C, E, F). HRTEM image (FIG. 2E, F) of the product showed the lattice spacing of 0.33 nm corresponding to the d(112) plane which further confirmed the formation of the product. EDS intensity map was performed to confirm the presence of all the expected elements. Very low intensity of S in the EDS intensity map with high intensity of Pb, Mo, and O, presumably corresponded to replacement of O positions with S in the $PbMoO_4$ lattice. However, this low degree of S doping does not seem to affect the crystal structure as well as the interplanar distances.

Reaction with $Pb^{4+}$ creates $PbMoO_{4-x}S_x$ directly although the particles are much smaller making a broad PXRD. The morphology of the product was completely different in the $Pb^{4+}$ case. To confirm whether this product is indeed the same product as in the $Pb^{2+}$ case with different morphology, the final reaction product was subjected to PXRD after washing with a mixed solvent ($H_2O$: acetic acid). The obtained PXRD pattern was an exact match with $PbMoO_4$. The product then was also subjected to hydrothermal treatment at conditions similar to the previous case. Subsequently, PXRD measurement was done. All the peaks of the product became sharper without the disappearance of any, suggesting an increased crystallinity in the product after hydrothermal treatment. SEM images at different magnifications showed the rice grain kind of morphology of the final product (FIG. 3B-C). Raman spectrum of the product revealing the same feature as in FIG. 2D is not identical. The blue shift in $A_g^3$ and $B_g^5$ vibrational mode compare to $A_g^3$ and $B_g^5$ mode in $MoS_2+Pb^{2+}$ case suggesting reduced particle size and nanocrystalline nature (FIG. 3D). These may be inferred from HRTEM image in FIG. 3E, with a lattice spacing of 0.33 nm corresponding d(112) plane.

In order to further investigate the final product with rice-grain kind of morphology, mechanical grinding, of the same, was done using mortar and pestle. During the grinding, a visible colour change was observed from white to black in the inset of FIG. 4A. A broad feature was seen in the PXRD of the product (FIG. 4A). We attribute this to the formation of small particles. The formation of NPs within the range of around 5-50 nm was further confirmed by TEM image (FIG. 4C). The HRTEM images showed the lattice spacing of 0.33 nm which confirmed that no chemical change has occurred during the grinding (FIG. 4D-E). Further, it was confirmed by the Raman spectrum which showed all the characteristic peaks of $PbMoO_4$.

In order to further confirm the formation of the final product, the chemical state of the elements were analyzed using XPS (FIG. 5 A-D) [Du, W et al., Applied Surface Science 2015, 328, 428-435]. The XPS survey spectrum showed that the final product consisted of all the expected elements (Pb, Mo, O, and S) and no impurity peaks were detected. The specific scan in the Mo 3d region exhibited the four peaks corresponding to the presence of two types of oxidation states. The peaks at 229.3 eV and 232.4 eV correspond to the $3d_{5/2}$ and $3d_{3/2}$ Mo(VI) state, respectively. But the disappearance of one oxidation state of Mo 3d region was observed after hydrothermal treatment corresponding to the formation of a single phase in the final product. The peaks at 232.1 eV and 235.2 eV were assigned as $3d_5/2$ and $3d_3/2$ of Mo (VI) in the final product (FIG. 5A). The peaks at 138.7 eV and 143.5 eV were attributed to $4f_{7/2}$ and $4f_{5/2}$ of Pb(II) in $PbMoO_{4-x}S_x$ (FIG. 5B). Another doublet centered at lower binding energy (135.8 eV and 140.2 eV) were assigned to $4f_{7/2}$ and $4f_{5/2}$ of Pb(II) arising due to the presence of another binding site. FIG. 5D showed the XPS at the $O_{1s}$ region with a peak centered at 529.9 eV. Like the final product, the material before the hydrothermal treatment also showed one peak in the $O_{1s}$ region. The presence of dopant S was further confirmed by scanning the S 2p region (FIG. 5C). The two peaks at 161.6 eV and 162.9 eV were assigned to $2p_{3/2}$ and $2p_{1/2}$ of $S^{2-}$ in $PbMoO_{4-x}S_x$. The chemical reaction involves the conversion of Mo(IV) to Mo(VI) as revealed by XPS. This required the involvement of oxygen. In order to test the origin of oxygen, the reaction was performed at various pH. The reaction occurred only in basic medium. The hydroxyl ions present in the reaction medium are driving the reaction and the decrease in pH during the reaction has confirmed the origin of oxygen in the product. We propose a chemical reaction in which Mo(IV) was transformed to Mo(VI) driven by $OH^-$ ions while $OH^-$ formed $H_2O$ and $O_2$.

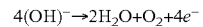

$$4(OH)^- \rightarrow 2H_2O + O_2 + 4e^-$$

Although the reaction is thermochemically nonspontaneous, it can be driven forward due to the involvement of metal ions. We conjecture that acetate ions (coming from lead acetate) are getting reduced to ethanol during the course of the reaction to balance the charge. To prove this, the same reaction was done taking lead nitrate as a precursor and the formation of $NO_2$ was examined by in situ mass spectrometric detection. Both the reactant solutions were purged with Ar to remove the dissolved $O_2$, separately. Then the lead nitrate solution was injected into the $MoS_2$ dispersion taken into an enclosed vessel. The mixture of gases inside the vessel were analysed after 2 h reaction using a residual gas analyzer. An increase in ion current was observed for both $NO_2$ and $N_2$ due to the increase in partial pressures of the corresponding gases. When the control (MoS$_2$ dispersion without lead acetate solution) was analysed, reduced ion current for NO$_2$ was observed while ion current for N$_2$ (background gas) remained the same. The control and sample were analysed under identical reaction conditions to account for some unavoidable leakage. So, the overall reaction for the second and third step can be written as follows:

$$2Mo(IV) + 2O_2 + 4NO_3^- + 2H_2O + 4e^- \rightarrow 2MoO_4^{2-} + 4NO_2 + 4H^+ \quad (2)$$

$$MoO_4^{2-} + Pb^{2+} + S^{2-} \rightarrow PbMoO_{4-x}S_x \quad (3)$$

The experiment suggests the formation of an acid which was again supported by the decrease in the pH during the course of the reaction. With tap water, it was observed that as long as lead ions are present, these reactions do occur upon introducing n-MoS$_2$.

This unusual reactivity can be used for the capture and removal of lead ions from water. In a typical batch experiment, 50 mg of ce-MoS$_2$ adsorbed (0.5 mL, 4.2 mM, in term of Mo concentration) on alumina or silica was taken in a 200 mL of conical flask containing 50 mL of Pb$^{2+}$ solution. The removal % and uptake were calculated using the equations mentioned below:

$$\text{Removal \%} = \frac{Co - Ce}{Ce} \times 100$$

$$\text{Uptake } (q_e) = \frac{(Co - Ce)C}{m}$$

Where C$_o$ and C$_e$ are the initial and equilibrium concentrations of the metal ions, respectively, V is the volume of the solution (L) and m is the mass of the adsorbent (g). The removal capacities of Al$_2$O$_3$@ce-MoS$_2$ (282 mg/g) and SiO$_2$@MoS$_2$ (199 mg/g) nanocomposites for Pb$^{2+}$ were evaluated using the Freundlich adsorption isotherm. A plot of log q$_e$ (q$_e$=heavy metal uptake) vs log c$_e$ (c$_e$=equilibrium concentration of heavy metal ion) showed a straight line with intercepts 0.97, 0.68, 2.45 and 2.3 and slopes 0.47, 0.63, 1.05 and 0.80 for Al$_2$O$_3$, SiO$_2$, ce-MS$_2$@Al$_2$O$_3$ and ce-MoS$_2$@SiO$_2$, respectively. Batch experiments were performed with different initial concentrations ranging from 1 ppm to 200 ppm. The data were then fitted using the linear form of Freundlich adsorption isotherm, $$\log q_e = \log k_f + \frac{1}{n} \log C_e,$$

where k$_f$ is the amount of heavy metal ions adsorbed per g of adsorbent (mg/g). Although Freundlich isotherm is not perfectly valid due to the chemical reaction between MoS$_2$ and Pb$^{2+}$ ions, such models were used in similar case where MoO$_3$ reacted with Pb$^{2+}$ but still Langmuir and Freundlich adsorption isotherm were applied to calculate the adsorption capacity [Wu, Y et al., Journal of Colloid and Interface Science 2017, 491, 80-88].

It may be appreciated by those skilled in the art that the drawings, examples and detailed description herein are to be regarded in an illustrative rather than a restrictive manner.

We claim:

1. A process for scavenging lead (Pb) species from a solution, comprising—reacting nanoscale chemically exfoliated molybdenum disulfide (ce-MoS$_2$) nanosheets anchored on oxide supports with lead in solution at room temperature to obtain a reaction, whereby the reaction is rapid and spontaneous in a basic medium and results in formation of PbMoO$_{4-x}$S$_x$, and thereby scavenging the lead species as either or both of Pb$^{2+}$ and Pb$^{4+}$-from the solution.

2. The process of claim 1, wherein the ce-MoS$_2$ nanosheets have a size up to 1 μm in length and a thickness of 1-3 layers.

3. The process of claim 1, wherein the lead in solution is in a Pb$^{2+}$ and Pb$^{4+}$ state.

4. The process of claim 1, wherein the solution comprises one or more anions as counter ions for Pb$^{2+}$ and Pb$^{4+}$, said anions being selected from CH$_3$CO$_2^-$, Cl—, NO$_3^{2-}$, SO$_4^{2-}$, and O$^{2-}$.

5. The process of claim 1, wherein the ce-MoS$_2$ nanosheets are supported on oxide and polymeric substrates that comprise one or more of SiO$_2$, Al$_2$O$_3$, polystyrene and polyvinyl chloride.

6. The process of claim 1, wherein the supported ce-MoS2 nanosheets comprise a filter in a filtering device to remove lead (Pb) species from the solution, the filtering device comprising at least one format selected from a candle, a molded porous block, a filter bed, a column, packets and bags.

7. The process of claim 1 wherein the solution is selected from an aqueous solution and a non aqueous solution.

8. The process of claim 1, wherein the solution comprises air and the lead species is present in the air, in suspended form.

9. The process of claim 1, wherein ce-MoS$_2$ reacts with either or both of Pb$^{2+}$ and Pb$^{4+}$.

10. A process—for scavenging a heavy metal species from a solution, comprising—reacting—nanoscale chemically exfoliated molybdenum disulfide (ce-MoS$_2$) nanosheets anchored on oxide supports with a heavy metal in solution at room temperature to obtain a reaction, whereby the reaction is rapid and spontaneous in a basic medium and results in formation of a heavy metal-MoO$_{4-x}$S$_x$, and thereby scavenging the heavy metal species from the solution, wherein the heavy metal comprises at least one of lead, arsenic, cadmium, mercury and chromium.

* * * * *